(12) United States Patent
Kakande et al.

(10) Patent No.: US 9,069,192 B2
(45) Date of Patent: Jun. 30, 2015

(54) OPTICAL SIGNAL PROCESSING

(75) Inventors: Joseph Kakande, Southampton (GB); Francesca Parmigiani, Southampton (GB); Periklis Petropoulos, Southampton (GB); David John Richardson, Southampton (GB); Radan Slavik, Southampton (GB)

(73) Assignee: University of Southampton, Southampton (GB)

( * ) Notice: Subject to any disclaimer, the term of this patent is extended or adjusted under 35 U.S.C. 154(b) by 305 days.

(21) Appl. No.: 13/825,038

(22) PCT Filed: Sep. 16, 2011

(86) PCT No.: PCT/GB2011/001357
§ 371 (c)(1),
(2), (4) Date: Mar. 10, 2014

(87) PCT Pub. No.: WO2012/035304
PCT Pub. Date: Mar. 22, 2012

(65) Prior Publication Data
US 2013/0208334 A1    Aug. 15, 2013

Related U.S. Application Data

(60) Provisional application No. 61/384,289, filed on Sep. 19, 2010.

(30) Foreign Application Priority Data

Sep. 20, 2010  (GB) .................................. 1015642.0

(51) Int. Cl.
*H01S 3/00* (2006.01)
*G02F 1/01* (2006.01)
*H04B 10/291* (2013.01)

(52) U.S. Cl.
CPC ................. *G02F 1/01* (2013.01); *H01S 3/0092* (2013.01); *H04B 10/291* (2013.01)

(58) Field of Classification Search
CPC ....... H01S 3/06758; H01S 3/108; H01S 3/23; H01S 3/0092; H04B 10/291; H04B 10/2912
USPC .................................................. 359/333, 328
See application file for complete search history.

(56) References Cited

U.S. PATENT DOCUMENTS

2007/0216994 A1    9/2007  McKinstrie
2010/0021105 A1*   1/2010  Watanabe ....................... 385/11

FOREIGN PATENT DOCUMENTS

EP      2148242      1/2010
EP      2161860      3/2010

OTHER PUBLICATIONS

Takano Kyoya , "Phase-sensitive Amplifier Based on Two-pump Four-wave Mixing in an Optical Fiber", IOOC-ECOC. Euro. Conf. on Opt.Comm. Int. Conf. on Integr. Opt. Jan. 1, 2006, pp. 1-2, XP040381401, DOI: 10.1109/ECOC.2006.4800934.

*Primary Examiner* — Mark Hellner
(74) *Attorney, Agent, or Firm* — Nadya Reingand

(57) ABSTRACT

An optical regenerator for regenerating a multi-level phase encoded signal. A first non-linear medium (HNLF1) generates a comb of frequency harmonics from the signal under the action of a coherent pump, each component bearing the phase encoded data. A filter selects the first and (M−1)th order components. The filtered signal is then input to a second non-linear medium (HNLF2) where a further pump is applied, to coherently add the first and (M−1)th order components and regenerate the signal by reducing phase noise.

12 Claims, 16 Drawing Sheets

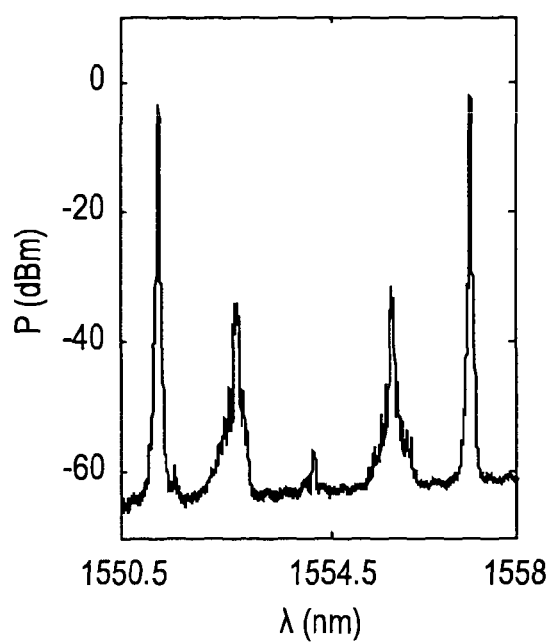
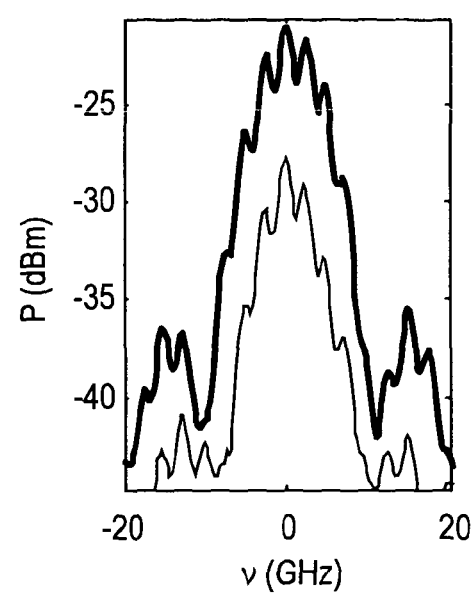
FIG. 8A
FIG. 8B

OPTICAL SIGNAL PROCESSING

CROSS-REFERENCE TO RELATED APPLICATIONS

This patent application is a National stage application of the PCT/GB2011/01357 filed on Sep. 16, 2011 which claims priority from Provisional Application 61/384,289 filed on Sep. 19, 2010 and Great Britain application 1015642.0 filed on Sep. 20, 2010.

BACKGROUND OF THE INVENTION

The invention relates to optical signal processing, and in particular an optical device for regenerating optical signals containing phase-encoded data, or quantizing the phase of any input phase modulated signal.

The future of optical fiber communications will be dictated by the need for long reach, high capacity and energy efficient technologies. Transitioning to spectrally efficient modulation formats such as quadrature phase shift keying (QPSK) provides significant capacity gains in long haul optical links. Fully coherent optical signal detection combined with high speed analog-to-digital conversion allows signal processing in the electronic domain, providing capabilities such as compensation for chromatic and polarization mode dispersion, as well as for some of the accumulated nonlinear phase noise which is the dominant limitation in extending coherent transmission spans (see, for example, E. Ip et. al., Opt. Express 16, 753-791; 2008).

However, the power consumption as well as the significant computing overhead associated with the aforementioned electronic functions means (see, for example, K. Roberts et. al., J. Lightwave Technol. 27, 3546-3559; 2009) that a combination of optical signal processing with optical dispersion compensation may still prove competitive for long haul transmission, particularly as signalling rates continue to rise.

A long term goal of research into all-optical signal regeneration has been to identify techniques capable of processing advanced formats with multiple levels in phase or/and amplitude. One proposed scheme utilises a pair of conjugated signal-idler channels transmitted along the link and combined in a non-degenerate PSA (see, for example, M. Vasilyev, Opt. Exp., 13, 7563; 2005); however this wastes valuable transmission bandwidth, and requires impractically low levels of residual dispersion post-compensation. Other proposals to all-optically regenerate QPSK have focussed on scaling schemes intended for use with binary level signals, including an indirect approach utilising format conversion to on-off-keying (OOK), OOK regeneration, and OOK to differential QPSK (DQPSK) conversion (see, for example, M. Matsumoto, Opt. Express 18, 10-24; 2010) as well as a more direct technique using two parallel binary phase shift keying (BPSK) regenerators (see, for example, Z. Zheng et. al., Optics Communications 281, 2755-2759; 2008). Such schemes are significantly complicated by the requirement to fully length-match and stabilise multiple optical paths, as well as a component count that increases appreciably with the density of the modulation format, potentially offsetting some of the economic benefits of the spectrally efficient formats. To date, there have been no experimental demonstrations.

SUMMARY OF THE INVENTION

The invention provides an optical device for processing a multi-level phase modulated signal borne on a carrier, comprising: a first pump source operable to generate a first modulation free pump having an offset from the carrier; a first section of non-linear optical material arranged to receive the signal and the first pump, in which the pump and the signal are subject to four-wave mixing to generate a harmonic series of components of the signal separated in wavelength by the offset, the series of components including a first component and a second component; a second pump source operable to generate a second pump relatively coherent with the carrier and first pump, and having an offset from the second component; and a second section of non-linear optical material arranged to receive the first component and the second component as well as the second pump and optionally also the first pump, in which the first and second components are subject to coherent addition, thereby to regenerate the signal.

In some embodiments, the first and second pumps are offset from the first and second components in opposite frequency directions, and the second section of non-linear optical material is arranged to receive both the first and second pumps. In other embodiments, the second pump has a frequency between the first and second components, and the second section of non-linear optical material is arranged to receive the second pump, but not the first pump.

In some embodiments, the first and second sections of non-linear optical material are combined into a single contiguous optical path arranged to receive the signal and the first and second pumps. In other embodiments, the first and second sections of non-linear optical material are separate with the second pump being introduced to the second section of non-linear optical material, bypassing the first section of non-linear optical material.

The second pump is preferably driven by one of the components that is modulation free, which is any Mth order harmonic component, where M is an integer multiple of N, where N is the number of precoded phase states on the input data encoded signal, for example 4 in QPSK.

In embodiments of the invention, the first and second components are the first order harmonic component and the (N−1)th order harmonic component, where N is the number of precoded phase states of the input data encoded signal.

A pre-processing stage may be added to receive an optical amplitude modulated signal and convert it to an optical phase modulated signal, optionally in combination with a post-processing stage arranged to receive the regenerated optical phase modulated signal and reconvert it to an amplitude modulated signal. This allows multi-level amplitude modulated signals to be regenerated.

An embodiment of the pre-processing stage may include a multi-level amplitude modulated signal, and a modulation free pump source, a first section of non-linear optical material arranged to receive the signal and the pump, in which the pump and the signal are subject to cross phase modulation to transfer the amplitude modulation on the signal to phase modulation on the pump. The phase modulated pump is then used as the input signal to an optical phase regenerator; and at the regenerator output the regenerated phase modulation is converted back to amplitude modulation e.g. by performing an optical low-pass filtering function on the phase modulated signal or by mixing it with a tapped off portion modulation free pump. If required, any residual phase modulation on the now amplitude modulated signal can be eliminated in a non-linear chirp eliminator, such as via four wave mixing of the pump with another pump wave at a different frequency.

An optical regenerator is thus provided for regenerating a multi-level phase encoded signal. A first non-linear medium generates a comb of frequency harmonics from the signal under the action of a frequency offset modulation free pump, each component bearing a phase modulation that is a phase multiple of the multi-level phase encoded data. A filter selects the first and (M−1)th order components. The filtered signal is then input to a second non-linear medium where a further pump is applied, to coherently add the first and (M−1)th order components and regenerate the signal by reducing phase noise.

In some implementations of the optical regenerator within an optical transmission link, the input light from the transmission fiber to the regenerator may comprise multiple optical channels independently propagating through the optical transmission by means of wavelength division multiplexing, and/or polarization division multiplexing. The use of conventional longitudinally uniform nonlinear optical media is ideally suited to the regeneration of a single phase encoded signal channel, as a result the multiple signal channels would need to be first separated by means of polarization splitters (de-multiplexers) and wavelength de-multiplexers, arranged in any order. The various phase encoded signal channels would at this point all be separated into individual optical fibers (paths). An optical regenerator such as is provided by this invention would then be utilized to regenerate the phase of the signal in each optical path—with as many regenerators required as the number of independent signal channels. Following regeneration, the signal channels would then be recombined into a form suitable for transmission with the same spectral efficiency as was present at the output of the previous transmission link span, by means of a combination of wavelength multiplexers and polarization combiners (multiplexers), operated in any order.

The invention therefore also provides an optical device module for processing a plurality of wavelength division multiplexed multi-level phase modulated signals, comprising: an optical wavelength division demultiplexer for separating the plurality of signals onto respective optical paths; a respective plurality of optical regenerators as described arranged in respective ones of the optical paths to regenerate the respective signals; an optical wavelength division multiplexer for recombining the plurality of signals from the respective optical paths into a common output optical path.

The invention therefore further provides an optical device module for processing a plurality of polarization and wavelength division multiplexed multi-level phase modulated signals, comprising: a polarization splitter configured to separate the plurality of signals into respective subgroups of each polarization state; a plurality of optical wavelength division demultiplexers, each wavelength division demultiplexer configured to separate the plurality of signals of a given polarization state onto respective optical paths; for each wavelength division demultiplexer a respective plurality of optical regenerators as described arranged in respective ones of the optical paths to regenerate the respective signals; for each wavelength division demultiplexer an optical wavelength division multiplexer for recombining the plurality of signals from the respective optical paths into respective common optical paths, one for each polarization state; and a polarization combiner for recombining the signals from each polarization state into a common output optical path.

The invention therefore also provides an optical device module for processing a plurality of polarization division multiplexed multi-level phase modulated signals, comprising: a polarization splitter for separating the plurality of signals onto respective optical paths; a respective plurality of optical regenerators as described arranged in respective ones of the optical paths to regenerate the respective signals; and a polarization combiner for recombining the plurality of signals from each polarization state from the respective optical paths into a common output optical path.

BRIEF DESCRIPTION OF THE DRAWINGS

The invention is now described by way of example only with reference to the following drawings.

FIG. 5($b$) is similar to FIG. 5($a$), but shows how 30° and 80° components are modified in amplitude and phase.

FIG. 5($c$) shows the input-output transfer function of phase (solid line/left axis) and amplitude (dashed line/right axis) with a 3rd order coefficient m=0.4.

FIG. 8($a$) shows the power spectrum at the input of the second stage HNLF2 for the set up of FIG. 4—the experimental plot corresponding to the right-hand caption of FIG. 6.

FIG. 8($b$) shows the power spectrum at the output of the second stage HNLF2 for the set up of FIG. 4.

FIGS. 9($c$) and 9($d$) are constellation diagrams at the input and output of the regenerator of FIG. 4 with added phase noise at the input.

FIGS. 9($e$) and 9($f$) are constellation diagrams at the input and output of the regenerator of FIG. 4 with more added phase noise at the input than in FIGS. 9($c$) and 9($d$).

DETAILED DESCRIPTION

FIGS. 1($a$) and ($b$) show a conceptual diagram showing frequency components relevant for an optical regenerator according to a first embodiment for regenerating a multi-level phase encoded signal, where multi-level means more than binary, such as the four levels used in quadrature keying.

Figure 1A:
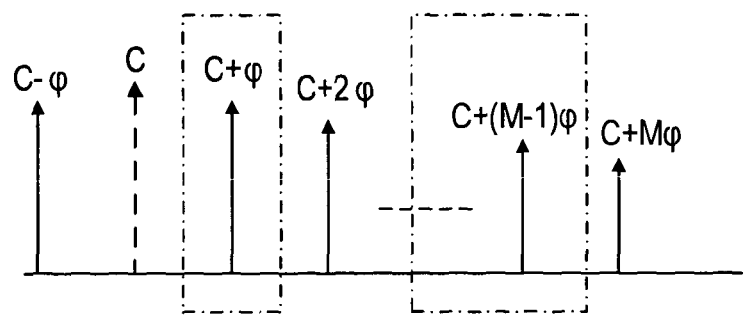
FIG. 1 is a conceptual diagram showing frequency components relevant for a four level quadrature phase shift keyed optical regenerator according to a first embodiment.

FIG. 1(a)—the upper part of the figure—shows a sequence of signal components generated by four wave mixing (FWM) of a phase encoded signal of the wavelength of the (zeroth order) component labeled C with a pump signal having a wavelength offset from the signal frequency. The signal components are separated equally in frequency or energy. It is also a good approximation to consider the signals to be equally separated in wavelength, and generally the plots in this document show wavelength rather than frequency or energy following convention. Generally a signal with phase encoded data of phase ϕ can be converted by four wave mixing with a pump signal having a wavelength offset from the signal frequency to the series of components illustrated which can be mathematically expressed as the expansion:

$$m_1\exp(i\cdot\phi)+m_2\exp(i\cdot 2\phi)+m_3\exp(i\cdot 3\phi)+m_4\exp(i\cdot 4\phi)\ldots m_M\exp(i\cdot M\phi)$$

The components are in a ladder, staircase, or comb with each element separated by the offset, i.e. difference, between the pump and signal frequencies. The first harmonic component is labeled C+ϕ and the Mth harmonic component as C+Mϕ.

FIG. 1 (b)—the lower part of the figure—shows another comb with matched wavelengths, wherein these signals are different from the signals of the upper part of the figure in that they do not contain any phase encoded data, but are pure carrier replicas, generated by continuous wave (CW) laser sources driven to be synchronous and coherent with the carrier of the phase encoded signal.

Figure 1B:
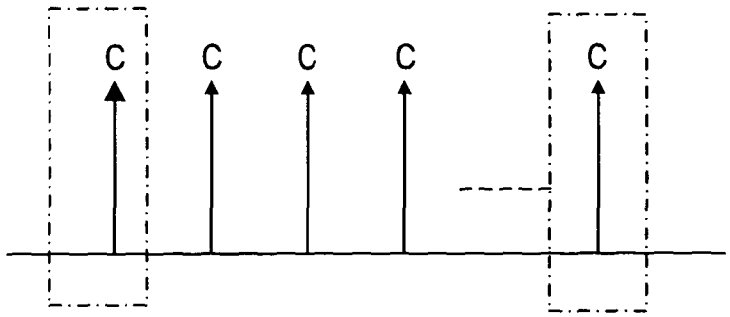

The FWM comb components of FIG. 1(a) thus have signal mixed with the carrier, whereas the CW comb components of FIG. 1(b) are locked to the carrier and free of signal modulation.

Conceptually, the optical regenerator of the first embodiment is based on generating the comb of FIG. 1 (a), selecting through filtering the first and (M−1)th order components—as indicated by the shading—and then, as shown by the shading in FIG. 1(b), providing carrier replicas as pumps at the wavelengths corresponding to the zeroth and Mth order components of the FWM comb. A second stage non-linear mixer is then provided to combine the four shaded signal components in a manner to regenerate the input signal. By regeneration, we mean the process of cleaning up the signal to reduce phase noise that has been introduced in the signal path of the phase-encoded signal by generation and transmission. In a long-haul optical fiber link, this means noise introduced by the long-haul optical fiber link, including any intermediate all-optical amplifiers in the transmission path.

Figure 2:
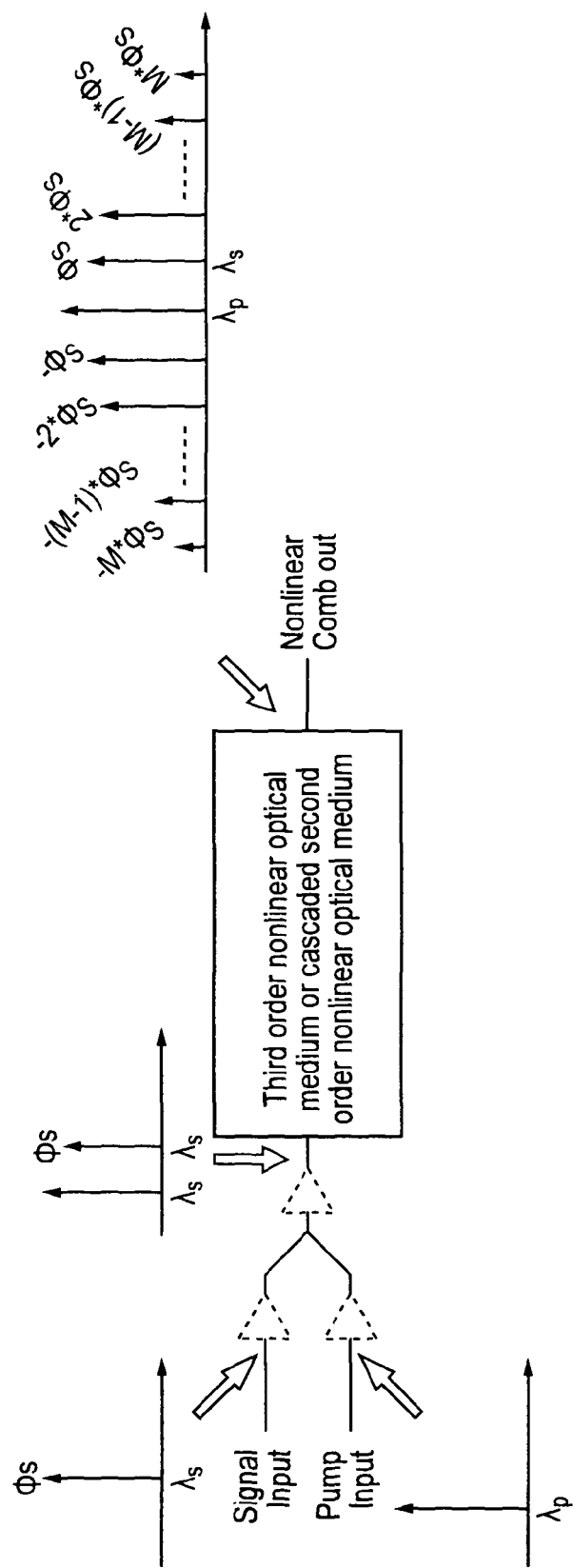
FIG. 2 shows a comb generator used in an optical regenerator of the first embodiment.

FIG. 2 shows a non-linear comb generator (NLCG) used in an optical regenerator of the first embodiment to generate the comb illustrated in FIG. 1 (a). Optional amplification stages are shown in dotted lines. A pump at wavelength $\lambda_p$ is supplied by a suitable pump source. The signal at wavelength $\lambda_s$ carrying phase data $\phi_s$ is combined with the pump and routed through a third order nonlinear optical medium or cascaded second order nonlinear optical medium to allow four wave mixing and thereby to generate the comb which has both high and low frequency components as illustrated. Only the lower frequency (higher wavelength) components are exploited in the first embodiment.

The non-linear medium of the non-linear comb generator (NLCG) can be chosen from a wide variety of known possibilities. In the example below, a silica highly nonlinear fiber is used. A non-exhaustive list of other options is: a silicon waveguide, liquid or gaseous nonlinear media, periodically poled lithium niobate (PPLN), a semiconductor waveguide, a chalcogenide waveguide. Microresonator, and nanowire nonlinear waveguide embodiments in crystalline and glass materials can also be envisaged.

Figure 3:
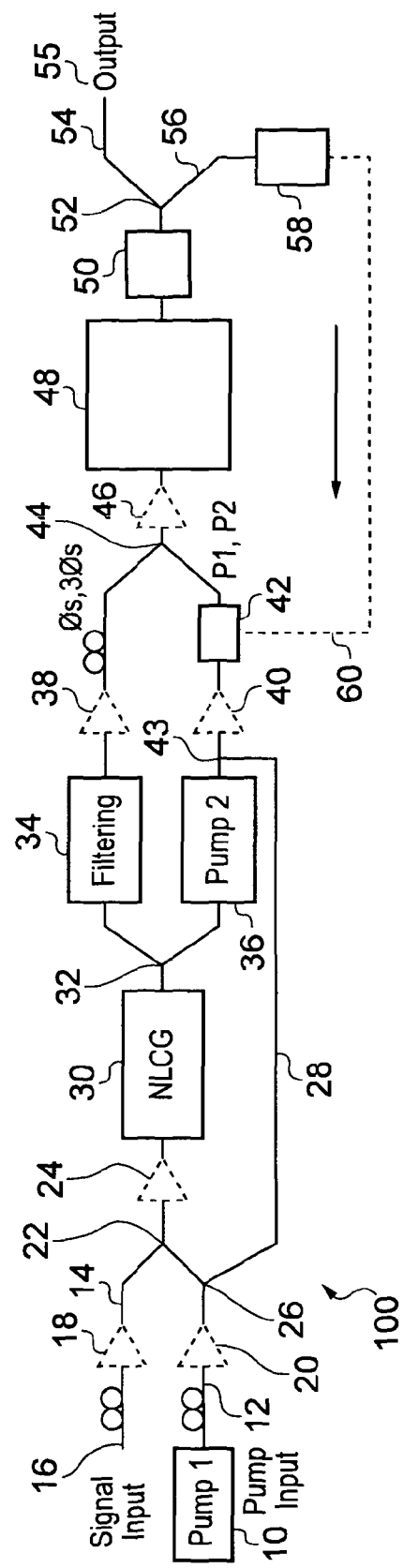
FIG. 3 is a block diagram of an optical regenerator according to the first embodiment.

FIG. 3 is a block diagram of an optical regenerator 100 according to the first embodiment. As in the previous figure optional amplifier stages are shown in dotted lines. The front end is the above-described NLCG which forms the first stage of the device. A pump 10 forming a first pump—Pump 1—supplies a pump input to a first optical path 12 and a second optical path 14 has an input 16 for receiving the signal. After passage of the pump and signal through respective optional amplifiers 18, 20, the pump and signal are combined at a combiner 22 which in fiber may be a splitter, and then after passage through a further optional amplifier 24 pass through a section of non-linear material 30 for four wave mixing resulting in comb generation.

Meanwhile, a portion of Pump 1 is tapped off at tap 26 into an optical path 28, which in fiber may be a splitter to be used later as a clean pump for the downstream parametric amplifier that has not yet been mentioned.

The output from the NLCG 30 is the comb of FIG. 1 (a). After splitting the output at a splitter 32, the 4th order component—which is modulation-free as a result of the cyclic nature of the phase evolution—is used as to drive a second pump source 36—Pump 2—in order to generate a modulation-free pump at the wavelength of the 4th order comb component. This is the right-hand greyed out component of FIG. 1(b). It is noted that any integer multiple of the 4th order component is modulation free, so in principle Pump 2 could be driven by one of the higher order comb components: 8th, 12th, 16th etc.

The second pump—Pump 2 or P2—is combined at node 43 with the tapped off component of Pump 1 or P1 by combining the P1 tap path 28 with the optical path from the output of P2 in preparation for recombining with selected ones of the modulated components output from the NLCG 30. From the output of the NLCG 30, filtering is applied to select or pick out the first and third order components $\phi_s, 3\phi_s$. After passage through respective optional amplifiers 38, 40, the modulated signal components $\phi_s, 3\phi_s$ and the pumps P1, P2 are combined at node 44 and after passage through an optional amplifier 46 are input to a second section of non-linear material 48. Like the NLCG 30, this stage is a section of third order nonlinear optical medium or cascaded sections of second order nonlinear optical medium to allow four wave mixing. The same materials options apply as mentioned for the NLCG 30. The second non-linear stage 48 acts as a dual pump parametric amplifier in which the input phase is quantized or squeezed to match the phase values corresponding to the multi-level logic being regenerated. This is described in more detail below with reference to a specific example.

The signal output from the second non-linear stage 48 is or at least contains the regenerated signal, but is passed through a filter 50 to strip out the pump wavelengths and is then output through optical path 54 to output 55.

Figure 4:
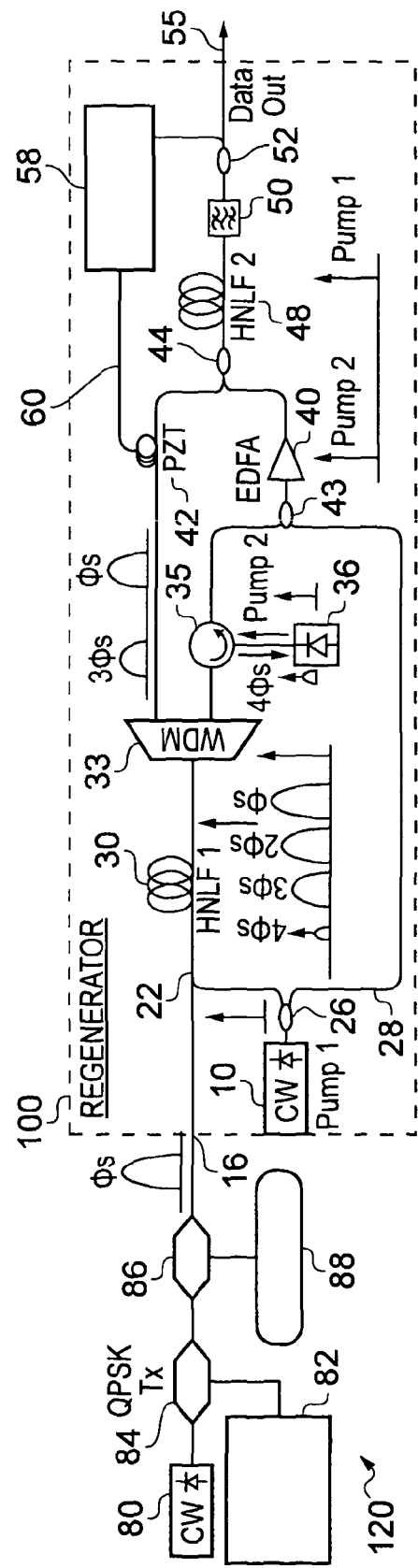
FIG. 4 shows an experimental set up for demonstrating an optical regenerator according to the first embodiment including a signal synthesis stage to generate a suitable input and the example optical regenerator.

For feedback, a portion of the output is tapped off at node 52 into a path 56 which leads the tapped off signal component to a photodetector 58 with a relatively slow response time compared with the bandwidth of the signal. An electrical signal is output from the photodetector 58 on electrical line 60 to drive an optical phase shifter 42 arranged in one of the arms containing either the pumps or the modulated signal components in order to correct for phase error and thereby lock the phase of the pumps and the modulated signal components to take account of different and possibly time varying path lengths between the signal path and the pump path. In the figure, the phase shifter 42 is shown in the pump path. FIG. 4 is a diagram of an experimental demonstrator of the optical regenerator of FIG. 3. The components of the regenerator 100 are shown contained within the dashed rectangle. Also shown to the left of the figure are the components of a signal synthesizer 120. A continuous wave (CW) laser 80 outputs a carrier signal of wavelength $\lambda_s$=1555.7 nm in the demonstrator which is then modulated with a pseudo-random binary sequence (PRBS) in a transmitter 84 to carry a 10 Gbaud QPSK signal generated by a pattern generator 82. A white noise generator 88 is then connected to a phase modulator 86 lying in the path of the QPSK signal and is operable to apply selected amounts of noise to the signal to test the regenerator's response to varying degrees of phase noise in the input signal. The phase modulator is made of lithium niobate—$LiNbO_3$—and is driven by variable power levels of electrical white noise spanning up to 8 GHz.

A QPSK signal $\phi_s$ with controlled amounts of phase noise can thereby be supplied to the input of the regenerator 100.

The structure of the regenerator 100 of FIG. 4 is in principle the same as that of the higher level drawing of FIG. 3, but includes some minor variations in selection of components and their relative arrangement. Like or corresponding components are marked with the same reference numerals.

Highly non-linear fibers (HNLFs) are used for the first and second non-linear stages 30 and 48 and marked HNLF1 and HNLF2 respectively. Pump 1 is a CW semiconductor diode laser, the output from which is split by a 50:50 coupler into a principal component for generating the comb in HNLF1 when combined with the input signal, and a secondary component to pump the second stage HNLF2 via tap path 28. In the demonstrator, the input signal is amplified to 22 dBm and combined in HNLF1 with a 14 dBm portion of Pump 1 at a wavelength of 1557.5 nm to generate the FWM comb. This design is all the same as described for FIG. 3. Slightly different from what is shown in FIG. 3, but with the same function, a wavelength division multiplexer (WDM) 33 is use to demultiplex the comb components output from HNLF1, so that the desired components $\phi_s$, $3\phi_s$ can be fed on to the second stage HNLF2, and the modulation-free component $4\phi_s$ for the second pump can be separately routed to drive an injection locked slave laser 36 which acts as the second pump. Again slightly different from FIG. 3, the component $4\phi_s$ is routed to Pump 2 via a circulator 35 which also routes Pump 2 from the slave laser 36 to node 43 where the pumps are combined and then amplified by an erbium doped fiber amplifier (EDFA) 40.

HNLF1 was 500 m long with a nonlinear coefficient of 10.7/W/km, a zero dispersion wavelength (ZDW) of 1544 nm and a dispersion slope (DS) of 0.029 ps/nm²/km. The $4\phi$ term at a wavelength of 1551.2 nm was de-multiplexed from the comb and injected into a semiconductor laser (see, for example, R. Weerasuriya et al., OFC'2010, OWT6), providing Pump 2. The rest of the comb was passively filtered out leaving the signal and harmonic at a wavelength of 1552.7 nm. These were combined with the pumps in HNLF 2, with a total pump power of 24 dBm.

The modulated signal components $\phi_s$, $3\phi_s$ and the pumps P1, P2 are then combined at node 44 and input into the second non-linear stage 48 (HNLF2). The fiber HNLF2 had a length of 300 m, nonlinear coefficient 11.6/W/km, ZDW 1553 nm and DS 0.018 ps/nm²/km. The fiber HNLF2 also had a strain gradient to increase its stimulated Brillouin scattering (SBS) threshold. The output from HNLF2 is then filtered at filter 50 to remove the pumps and then output at output 55. As described for FIG. 3, a portion of the output signal is tapped off at tap 52, converted to an electrical signal in a photodiode 58, and fed back to a phase shifter 42 in the form of a piezoelectric fiber stretcher (PZT) to phase lock the two pairs of signals supplied to the second stage. This eliminated any slow relative phase drifts at the input 44 by monitoring the signal power at the output 52 and controlling the PZT 42.

In summary, the regenerator comprises first and second phase sensitive fiber optical parametric amplifiers arranged in line to provide the all-optical regeneration of a multi-level phase encoded signal—specifically a QPSK signal with 10 Gbaud quadrature.

Details of the operating principles and experimental data from the regenerator of the first embodiment, and specifically the experimentally implemented version of FIG. 4 are now described.

Multi-level phase regeneration requires a stair-case phase transfer function which, for an M-level optical PSK signal, is generated by interfering it with a conjugated $(M-1)^{th}$ phase harmonic. A semi-analytical way to understand this is as follows. Given QPSK signals for which M=4, a simple way to express this is:

$$A \cdot \exp(i \cdot \phi_{out}) = \exp(i \cdot \phi) + m \cdot \exp(-i \cdot 3\phi)$$

where $\phi$ is the input signal modulation, $\phi_{out}$ is the output modulation (regenerated), A is a phase-to-amplitude conversion term and m is a coefficient to optimise the phase regeneration.

Figure 5A:
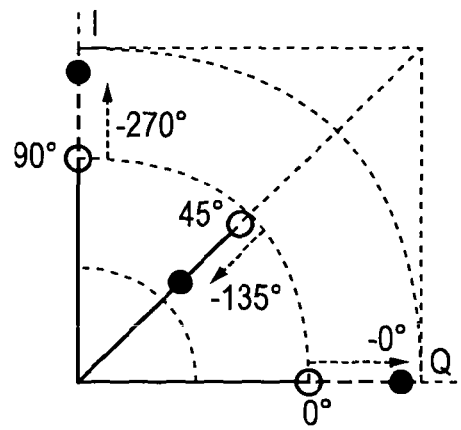
FIG. 5($a$) shows how amplification is achieved for I and Q quadratures, and how the 45° component is de-amplified.

FIG. 5(a) is an Illustration of how amplification of I and Q quadratures is achieved while the 45° component is de-amplified. White circles denote input $\phi$; dotted vector denotes component $-3\phi$; and black circles denote output.

Figure 5B:
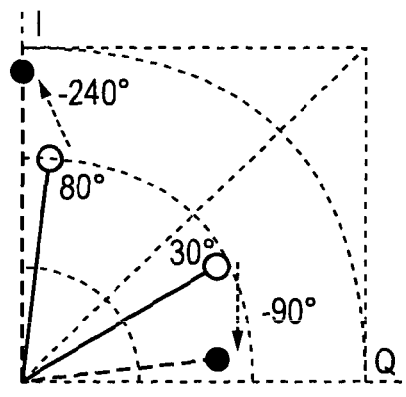

FIG. 5(b) corresponds to FIG. 5(a) but shows the effect of the transfer function on symbols at 30° and 80°.

Figure 5C:
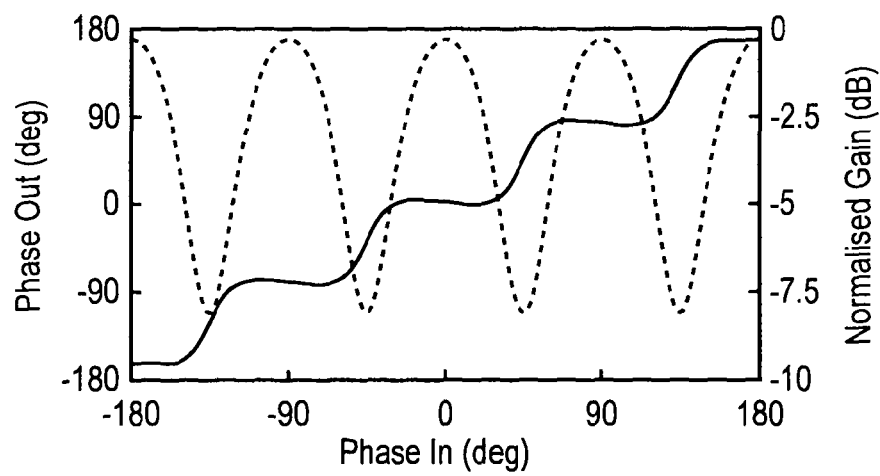

FIG. 5(c) is a graph of a complete semi-analytical transfer function showing phase and amplitude response (m=0.4).

FIG. 5(a) and FIG. 5(b) illustrate in a simple fashion how this provides phase regeneration. For symbols aligned to the principal axes of 0° and 90° (I and Q), $\phi$ and $-3\phi$ are exactly in phase with each other, and their combination leads to constructive interference as shown in FIG. 5(a). However, for symbols aligned at 45°, $\phi$ and $-3\phi$ are 180° out of phase leading to destructive interference. FIG. 5(b) shows an example of the phase re-alignment for two sample points with input phases of 30° and 80°. The value of m optimises the overall phase transfer characteristics; for a π/2 step period (i.e. a QPSK signal) it should be approximately 0.35-0.5 (in amplitude, not power). The complete transfer function is shown in FIG. 5(c). Detailed numerical simulations have been carried out verifying this analytical approach.

To practically achieve multilevel phase regeneration, we utilise a two step process. First, the QPSK signal is mixed with a pump to generate a four wave mixing (FWM) comb, including the required $3\phi$ (referred to from now on as the harmonic)

Figure 6:
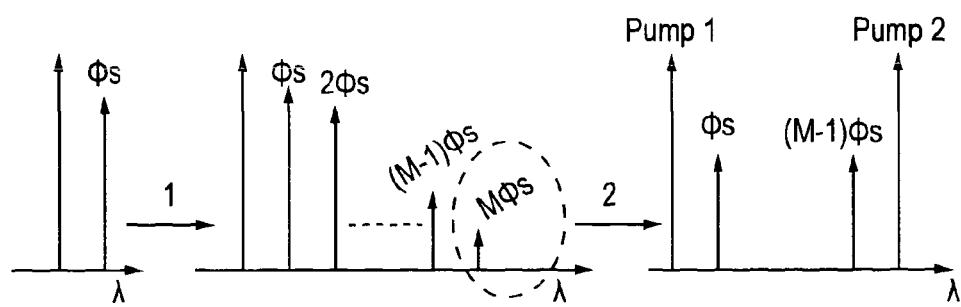
FIG. 6 is a schematic drawing illustrating the relevant comb components and pump signals in the device of the first embodiment.

FIG. 6 shows regeneration in two steps. Step 1: Nonlinear generation of phase harmonics via four wave mixing (FWM) followed by pump recovery. Step 2: Parametric phase sensitive gain.

The signal and harmonic are then combined inside a dual pump non-degenerate phase sensitive amplifier (PSA) where the coherent addition occurs. Of the two required pumps, the first is derived from the free running laser originally used in the comb generation stage, and the second by injection locking the $4\phi$ (modulation stripped) wave to a semiconductor laser, satisfying the phase locking requirement. The relative powers of the signal and harmonic need to be optimised to take the amplifier power gain G into account; as such a signal-harmonic offset of $m_{eff}$ is used, where $m_{eff}=m*\text{sqrt}(1-1/G)$.

Reconfiguring the regenerator to an alternate modulation format such as 8-PSK can be achieved simply by generating a broader FWM comb (by increasing the signal and pump powers), passively selecting the desired harmonic and tuning the injection locked laser to the corresponding frequency.

Figure 7:
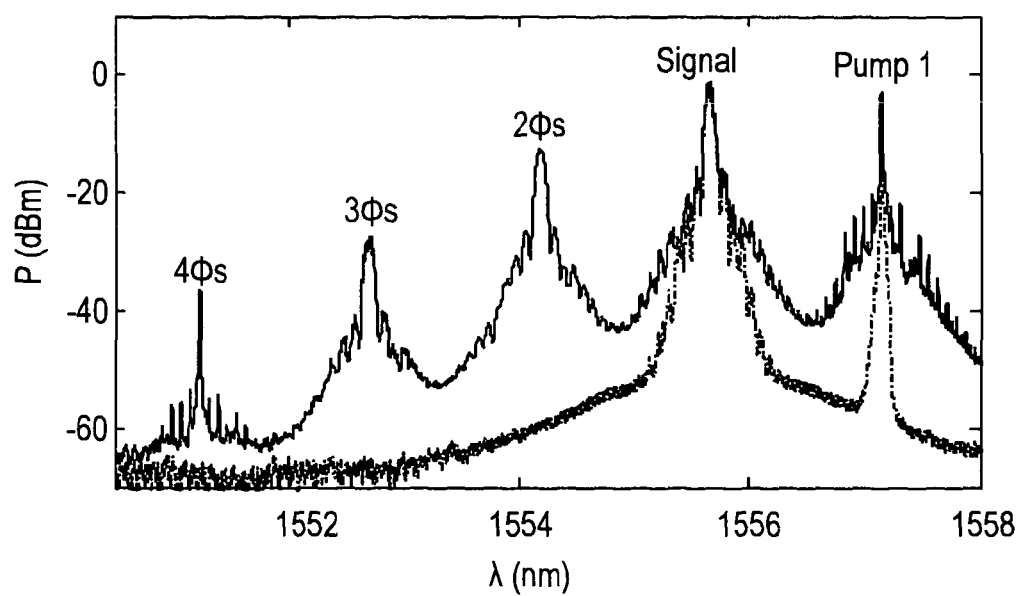
FIG. 7 is a graph of power spectrum showing output comb components ($\phi s$, $2\phi s$, $3\phi s$, $4\phi s$) as well as the power spectrum of the input (Signal and Pump 1).

FIG. 7 is a graph of power spectrum showing the principal components of the shorter wavelength half of the FWM comb output (φs, 2φs, 3φs, 4φs) as well as the power spectrum of the input (Signal and Pump 1).

FIG. 8(a) shows the power spectrum at the input of HNLF2 with the two pumps and the two modulated signal components ('input signal' φ and 'harmonic' 3φ) being evident. The input signal-to-harmonic power offset was 6 dB.

FIG. 8(b) is a graph showing frequency detuning v at HNLF2 output. The thick line (upper trace) shows the maximum power during the test and the thin line (lower trace) shows the minimum power during the test. As illustrated, the phase sensitive extinction, defined as the absolute power difference between the maximum and minimum measured signal powers at the parametric amplifier output, varying with the signal input phase, was measured at around 7 dB. The regenerator is operated at such a phase condition as provides the maximum possible signal power at the regenerator output.

The performance of the regenerator was assessed using a self-homodyne constellation analyser. It is noted that the sampling rate of the constellation analyser was the limiting factor in the choice of signal baud rate for the experiment.

Figure 9A:
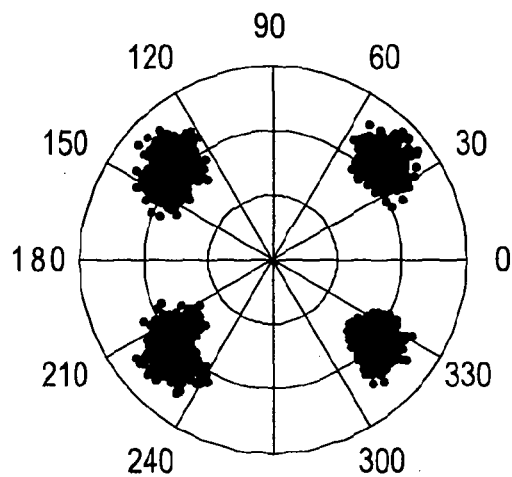
FIGS. 9($a$) and 9($b$) are constellation diagrams at the input and output of the regenerator of FIG. 4 with no added phase noise at the input.
Figure 9B:
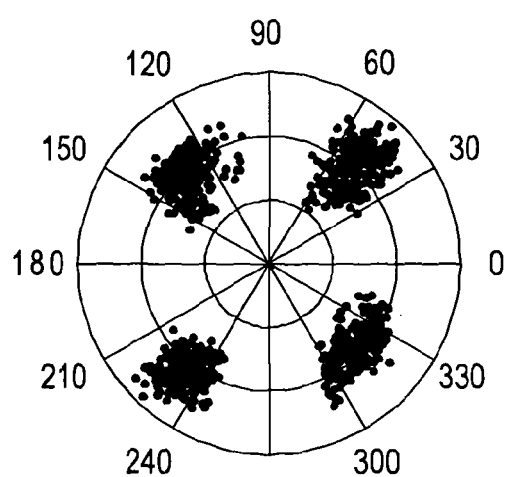

FIGS. 9(a) and 9(b) are constellation diagrams at the input and output of the regenerator of FIG. 4 with no added phase noise at the input.

Figure 9C:
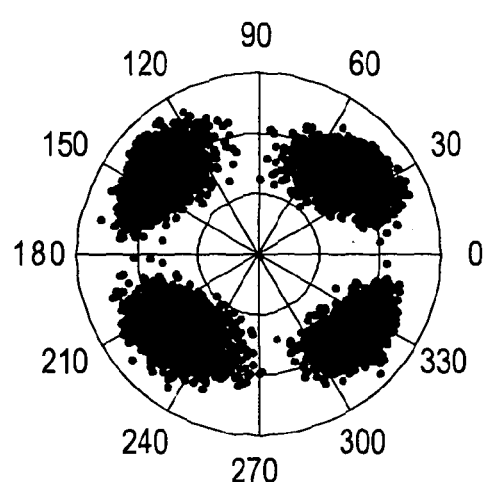
Figure 9D:
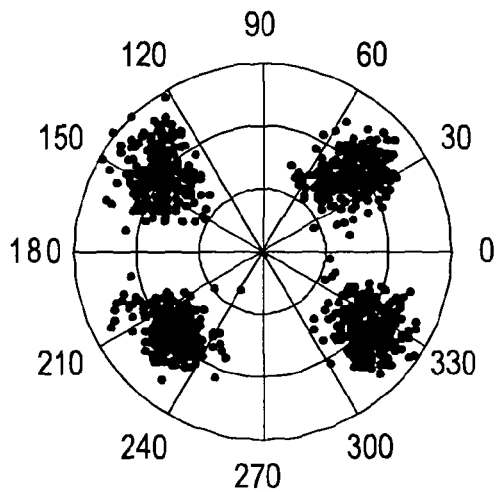

FIGS. 9(c) and 9(d) are constellation diagrams at the input and output of the regenerator of FIG. 4 with added phase noise at the input.

Figure 9E:
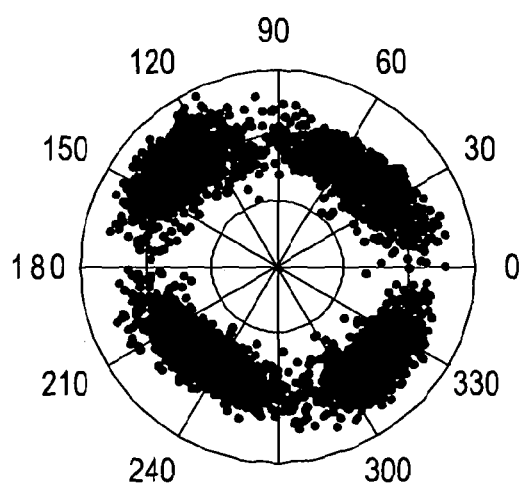
Figure 9F:
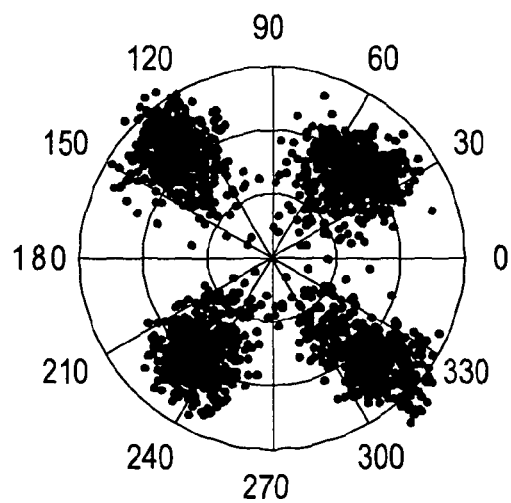

FIGS. 9(e) and 9(f) are constellation diagrams at the input and output of the regenerator of FIG. 4 with more added phase noise at the input than in FIGS. 9(c) and 9(d).

In the absence of any added noise, there was a slight degradation as evident by comparing FIG. 9(a) with FIG. 9(b). This stems primarily from the amplification and filtering of the signal within the regenerator, as well as ASE noise (amplified spontaneous emission noise) added by EDFAs.

FIG. 9(c) and FIG. 9(d) show that absolute phase deviations of up to 60° per symbol were squeezed down to about 30°.

FIG. 9(e) and FIG. 9(f) show that the regenerator was able to squeeze even larger phase fluctuations, but that this was accompanied by phase-to-intensity conversion. It is possible to suppress this by saturating the PSA as shown by our numerical simulations. However, for phase only formats such as QPSK, amplitude fluctuations impose little penalty, and therefore this is not crucial. It would however need to be addressed for different coding formats with both phase and amplitude encoding.

The level of squeezing illustrates one of the key benefits of PSA regenerators: assuming they are placed before a differential optical receiver, they have the potential to significantly reduce the BER (bit error rate) for severely degraded signals. This is because phase deviations are magnified by up to a factor of 2 during differential detection and therefore absolute deviations over ±22.5° for DQPSK can cause errors when differentially decoded, but these can be eliminated by a regenerator of the design described here.

In conclusion, an optical signal processing function is provided that has been experimentally demonstrated for phase regeneration of a multilevel PSK signal. This has been shown with a 10 Gbaud QPSK signal, reducing white noise phase deviations by a factor of at least 2.

Figure 10:
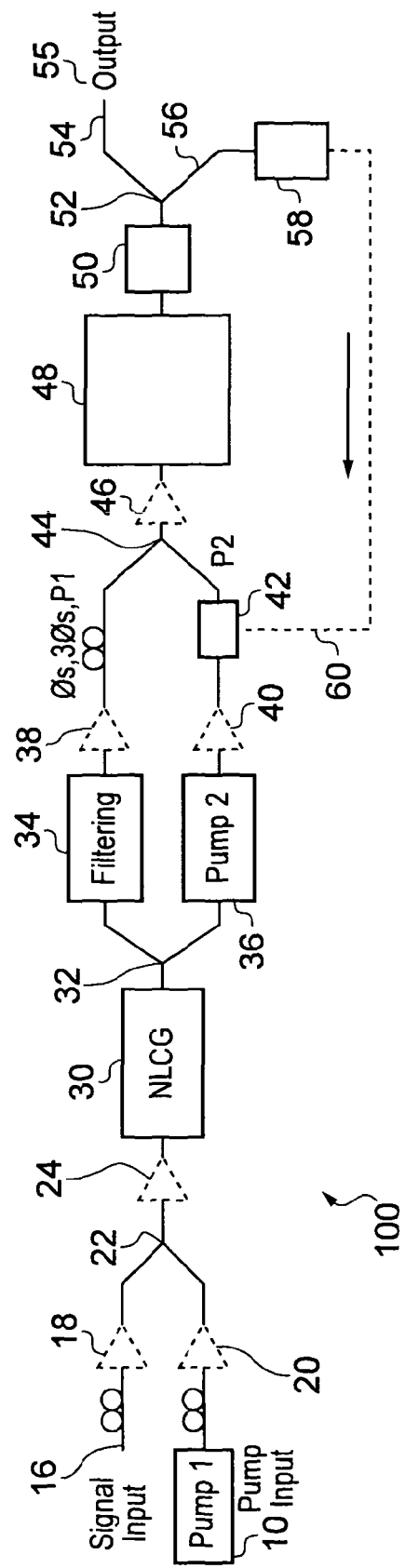
FIG. 10 is a block diagram of an optical regenerator according to the second embodiment.

FIG. 10 is a block diagram of an optical regenerator according to the second embodiment. Reference numerals are shared with the first embodiment for like components. Comparing FIG. 10 with FIG. 3, the only difference is that a portion of Pump 1 is not tapped off, so in the second embodiment all of Pump 1 is supplied to the NLCG 30. The filter 34 differs from its counterpart in the first embodiment in that it is configured to transmit at wavelengths of P1 as well as signal components φ and 3φ. Pump 2 is combined with P1, φ and 3φ at node 44 which in fiber can be realized with a 3-way coupler. All other aspects of the design of the second embodiment are the same as the first embodiment.

Figure 11:
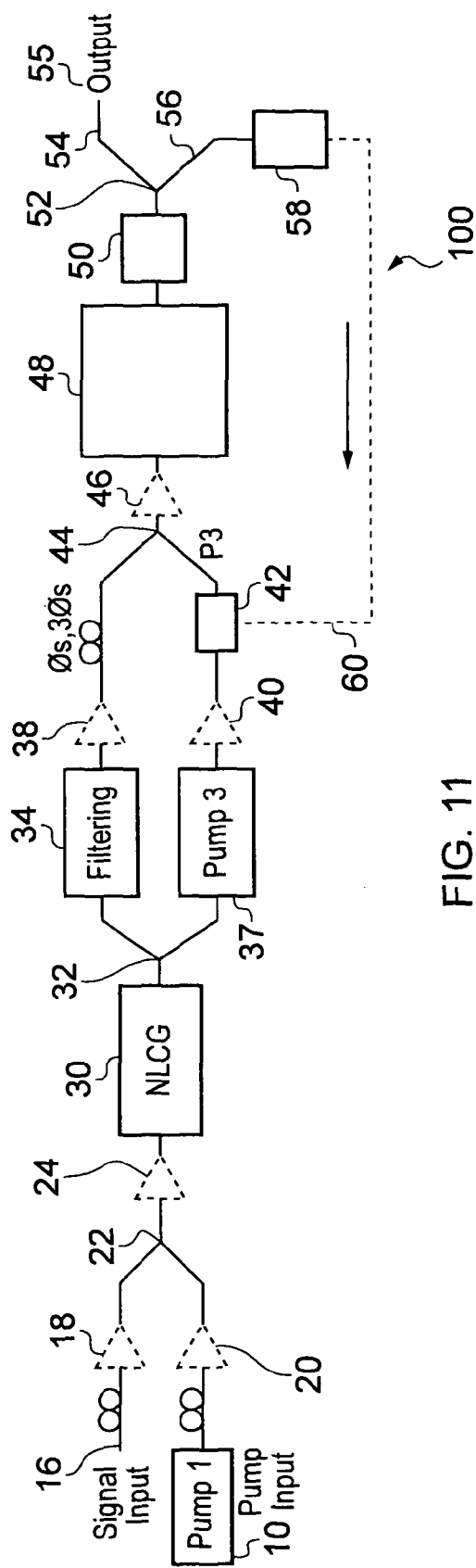
FIG. 11 is a block diagram of an optical regenerator according to the third embodiment.

FIG. 11 is a block diagram of an optical regenerator according to the third embodiment. Reference numerals are shared with the first and second embodiments for like components. Comparing FIG. 11 with FIG. 10, it is evident that the structural components of the second and third embodiments as illustrated are the same. The third embodiment differs from the second embodiment in that filter 34 is configured to block Pump 1, so like the first embodiment, the upper arm of the optical path between the first and second non-linear stages 30 and 48 conveys signal components φ and 3φ, but no pump. Moreover the second stage pump 37—Pump 3 is at a wavelength or more accurately energy midway between the signal components φ and 3φ, i.e. different from the schematic diagram of FIG. 1(b). The second non-linear stage 48 receives signal components φ and 3φ, and a single pump—Pump 3—rather than two pumps as in the first and second embodiments, thereby acting as a single pump parametric amplifier, as opposed to a dual pump parametric amplifier as in the other embodiments.

Figure 12:
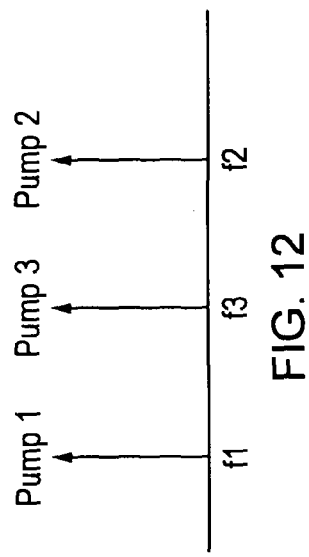
FIG. 12 shows the relationship between the second stage pump wavelengths used in the first, second and third embodiments.
Figure 13:
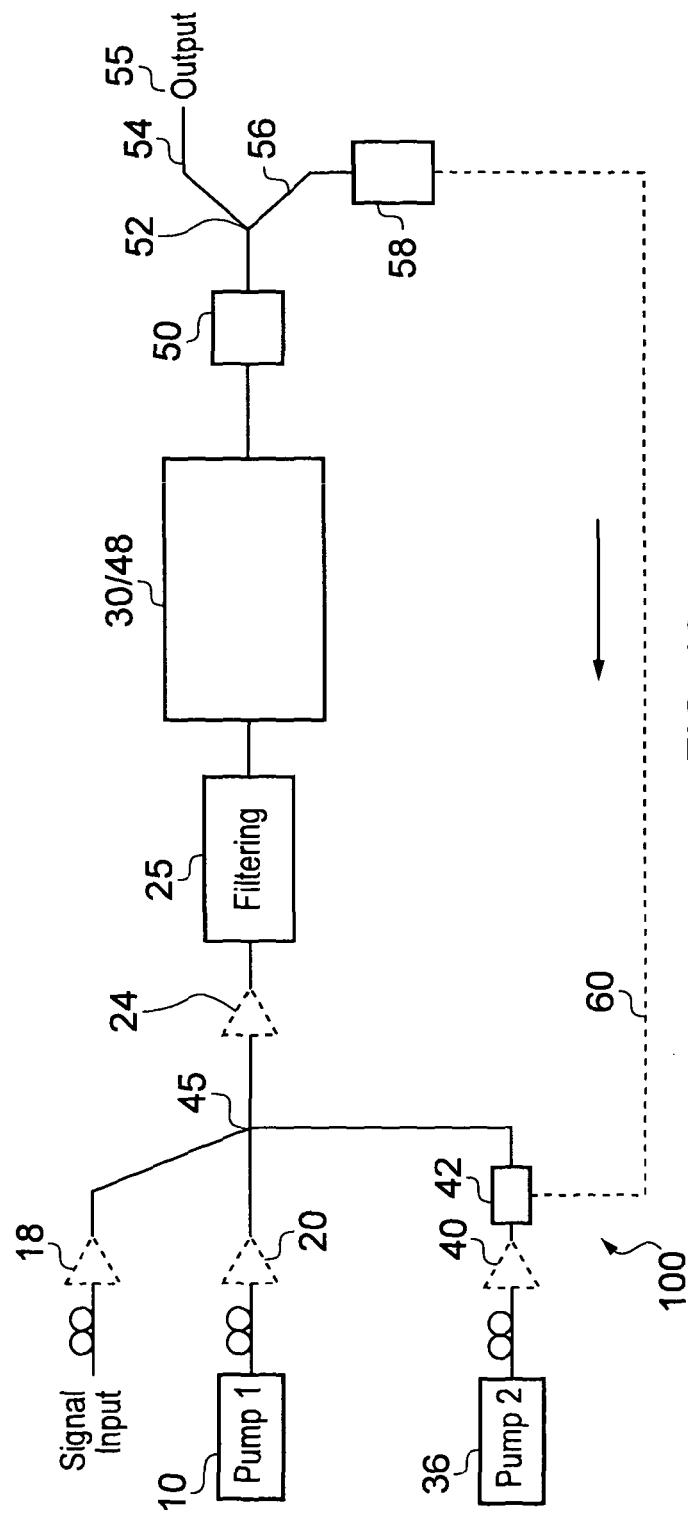
FIG. 13 is a block diagram of an optical regenerator according to the fourth embodiment.

FIG. 12 shows the relationship between the second stage pump wavelengths used in the first, second and third embodiments. In the third embodiment the pump energy or frequency is arranged equidistant between the two pump frequencies used in the first and second embodiments, or to express the same point in an alternative way, the frequency f3 of the pump in the third embodiment is the average of the frequencies f1, f2 of the two pumps of the first and second embodiments. Functionally the single pump P3 acts the same as the two pumps P1 and P2, since the energy difference between P3 and φ is the same as between P3 and 3φ so functionally equivalent mixing occurs in the second non-linear stage 48. In the third embodiment, Pump 3 thus has a frequency between the φ and 3φ components, whereas in the other embodiments Pumps 1 and 2 are offset from the φ and 3φ components in opposite frequency directions FIG. 13 is a block diagram of an optical regenerator according to the fourth embodiment. The fourth embodiment differs from the previous embodiments in that the two principal processing steps of non-linear comb generation and coherent addition of the signal and harmonic mediated by the pumps (or pump) are carried out in a single section of non-linear material 30/48, with the non-linear comb being created in the initial section of the non-linear medium, and the coherent addition taking place in the latter part of the non-linear medium. With this approach, the signal φ and the pumps P1, P2 are all combined at node 45 and supplied to the input of the non-linear medium via an (optional) amplifier 24 and a filter 25.

It will be understood that FIGS. 10, 11 and 13 showing regenerators according to the second, third and fourth embodiments are to be compared with FIG. 3 for the first embodiment. Moreover, it will be understood that the experimental demonstrator of the first embodiment shown in FIG. 4 provides examples of components and arrangements for experimentally implementing the second, third and fourth embodiments in similar fashion.

In some implementations of the optical regenerator within an optical transmission link, the input light from the transmission fiber to the regenerator may comprise multiple optical channels independently propagating through the optical transmission by wavelength division multiplexing, and/or polarization division multiplexing. Because the optical regenerator described herein is designed for the regeneration of a single phase encoded signal channel, the multiple signal channels would need to be first separated by means of polarization splitters (de-multiplexers) and wavelength de-multiplexers, arranged in any order. The various phase encoded signal channels would at this point all be separated into individual optical fibers (paths). An optical regenerator as described herein would then be utilized to regenerate the phase of the signal in each optical path—with as many regenerators required as the number of independent signal channels. Following regeneration, the signal channels would then be recombined into a form suitable for transmission with the same spectral efficiency as was present at the output of the previous transmission link span, by means of a combination of wavelength multiplexers and polarization combiners (multiplexers), operated in any order.

Figure 14:
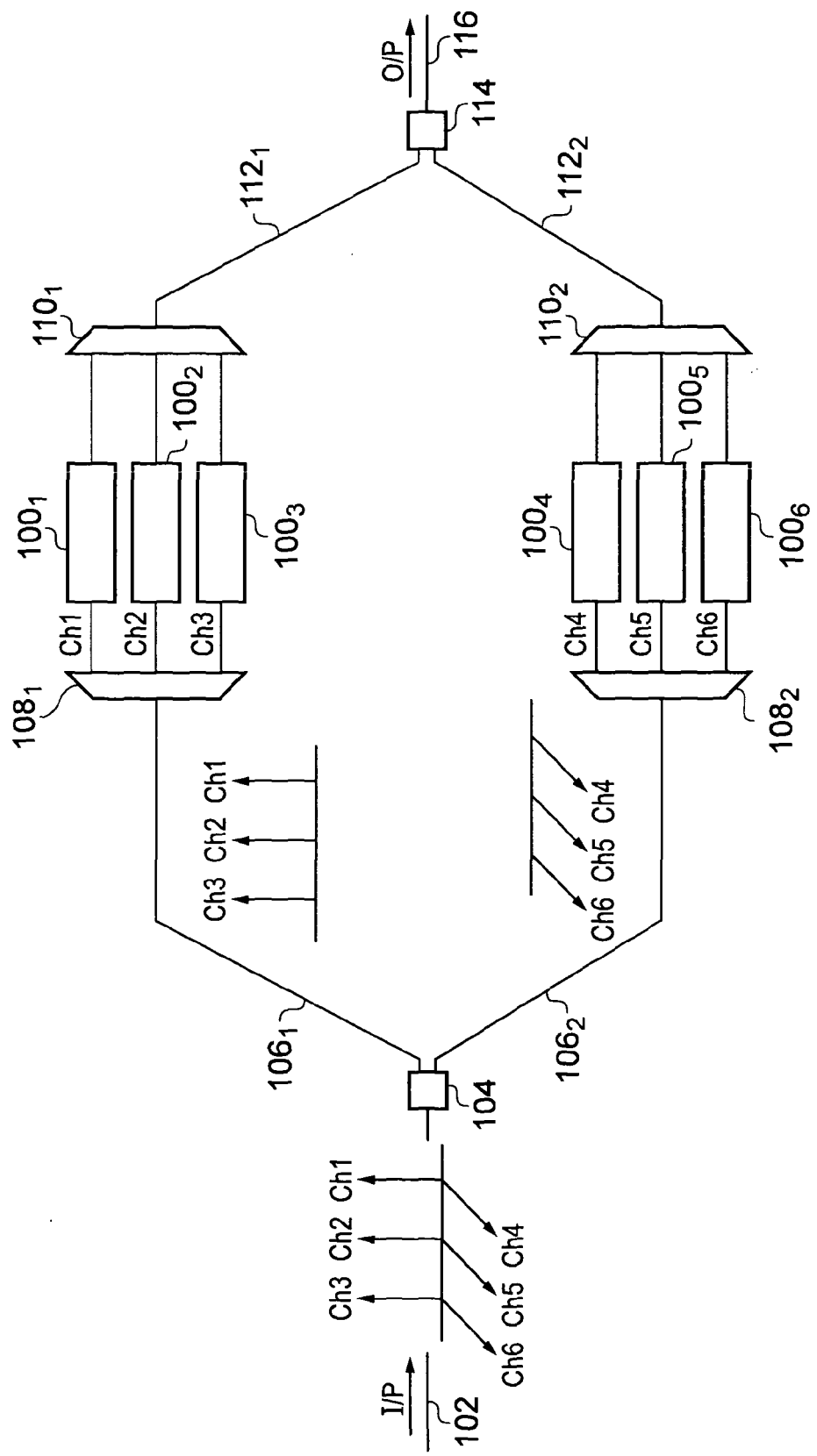
FIG. 14 is a block diagram of an optical device module for regenerating a multi-channel signal made up of multiple multi-level phase modulated signals that are multiplexed in polarization and wavelength.

FIG. 14 is a block diagram showing one such implementation of an optical device module for regenerating a multi-channel signal made up of multiple multi-level phase modulated signals that are multiplexed in polarization and wavelength. An input optical path 102 from a communication link conveys the multi-channel signal to the module. The figure shows schematically the example of there being 6 channels derived from 2 polarization states and 3 wavelengths. These numbers are of course arbitrary, and the low number of channels is chosen here principally for clarity of explanation. Each channel is a single multi-level phase modulated signal, such as QPSK. The signal is supplied from the input optical path 102 to a polarization splitter configured to separate the 2 polarization components. The polarization state of Channels 1, 2 and 3 is routed into a first arm $106_1$. The polarization state of Channels 4, 5 and 6 is routed into a second arm $106_2$. Each arm $106_1$, $106_2$ leads to a wavelength division demultiplexer $108_1$, $108_2$ which respectively serve to separate each group of 3 channels onto their own optical paths for input into respective optical regenerators $100_1$, $100_2$, $100_3$, $100_4$, $100_5$, $100_6$. Each regenerator is as described in any of the embodiments above. The regenerated signals in each arm output from the optical regenerator banks $100_1$, $100_2$ $100_3$ and $100_4$, $100_5$, $100_6$ are then recombined in wavelength division multiplexers $110_1$, $110_2$. The wavelength-recombined outputs from the two arms are then conveyed by optical paths $112_1$, $112_2$ to a polarization combiner which recombines the regenerated signals from each polarization state into a common output optical path 116.

From the module describe above with reference to FIG. 14, it will be immediately understood how other processing modules may be constructed to deal with a wavelength division multiplexed signal without polarization division multiplexing. Essentially the module would be one of the arms illustrated in FIG. 14. Similarly, it will also be clear how a processing module may be constructed to deal with a polarization division multiplexed signal without wavelength division multiplexing. Essentially the module would be the same as illustrated in FIG. 14 except that the wavelength demultiplexers and multiplexers would be omitted, since there would only be one signal channel in each arm.

The optical signal regenerators described herein are not only applicable to pure phase modulated signal formats such as QPSK, but may also be applied to regenerate signals in amplitude modulated data formats.

Figure 15:
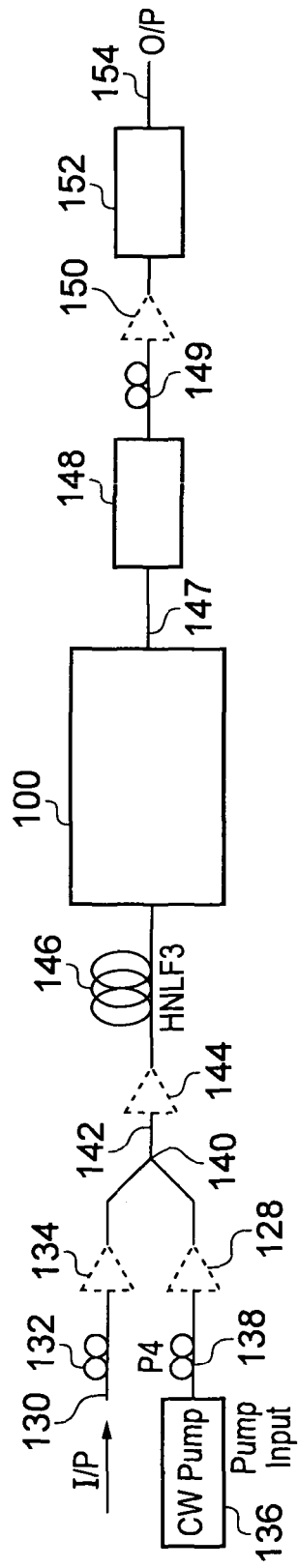
FIG. 15 is a block diagram showing a device module according to a further embodiment for regenerating signals in an amplitude modulated data format.

FIG. 15 is a block diagram showing a device module for regenerating signals in an amplitude modulated data format. In broad terms, this is achieved by providing a pre-processing stage which converts amplitude modulation to phase modulation, and then a post-processing stage to re-convert the regenerated phase modulated data signal back into amplitude modulation. An amplitude modulated signal is input at an input 130 and then passed along an optical path 132 through an optical amplifier 134 (optional). A CW pump source 136 provides a pump—Pump 4—which is directed along an optical path 138 through an optical amplifier 128 (optional) and combined at a coupler 140 with the amplitude modulated signal from optical path 132. After passage along an optical path 142 through an optical amplifier (optional) 144 the pump P4 and amplitude modulated signal are supplied to a highly non-linear fiber 146 (HNLF3) in which the pump and the signal are subject to cross phase modulation to transfer the amplitude modulation on the signal to phase modulation on the pump. An optical phase regenerator 100 as described in connection with the first to fourth embodiments is then arranged to receive the output of HNLF3 and squeeze the phase modulation to regenerate the signal. The output of the phase regenerator 100 is supplied via an optical path 147 to a low pass optical filter 148 to convert the cleaned-up phase modulated data back to amplitude modulated data. The output of the low pass filter 148 is passed via an optical path 149 through an optical amplifier 150 (optional). The signal is then processed to remove any residual phase modulation on the now amplitude modulated signal by passing it through a nonlinear chirp eliminator 152 (optional), such as via four wave mixing of the pump with another pump wave P5 provided by another pump source (not shown) at a different frequency. The regenerated amplitude modulated signal is then output from the module at output 154.

Figure 16:
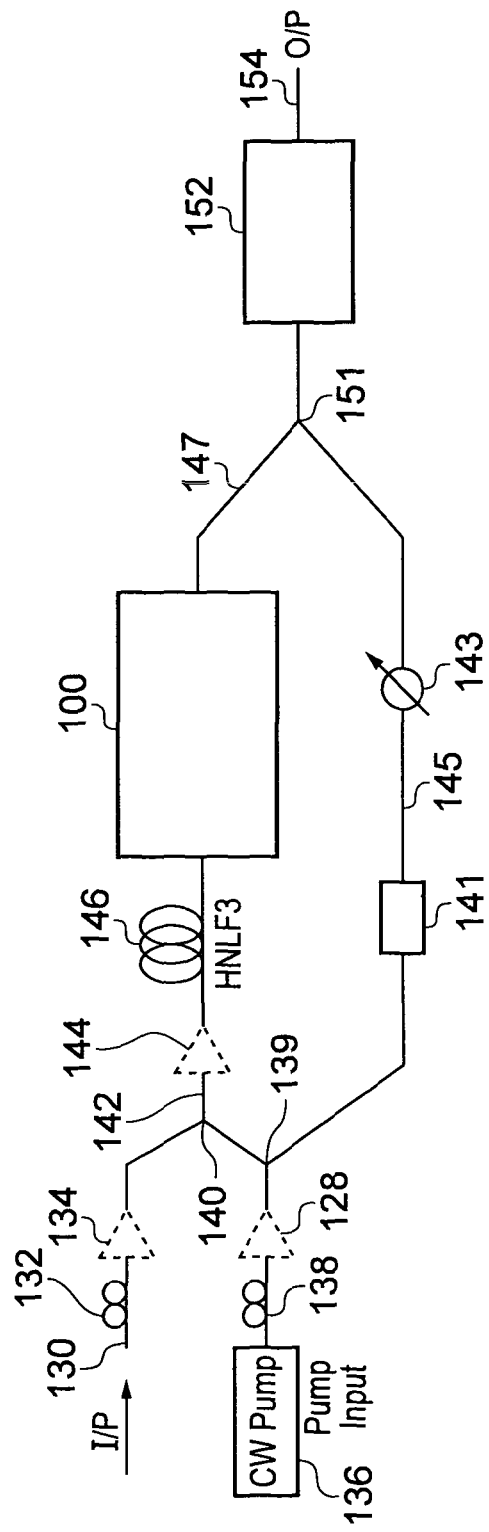
FIG. 16 is a block diagram showing an alternative device module according to another embodiment for regenerating signals in an amplitude modulated data format.

FIG. 16 is a block diagram showing another device module for regenerating signals in an amplitude modulated data format. The common parts with the module of FIG. 15 are labelled with the same reference numerals. The design of FIG. 16 differs from that of FIG. 15 in that the regenerated phase modulation is converted back to amplitude modulation by mixing it with a tapped off portion modulation free pump, instead of using a low pass filter. This is achieved by tapping off a portion of Pump 4 from optical path 138 at node 139 along an optical path 145. The node 139 may be implemented in optical fiber or other waveguide technology with an optical coupler of suitable power ratio. After optional filtering with a phase shifter 141 and attenuator 143, the tapped off portion of Pump 4 is then combined with the output of the optical phase regenerator 100 at a node 151 which results in mixing which converts the regenerated phase modulation back to amplitude modulation.

It will further be understood that a device module can be provided to regenerate signals in data formats which have data encoded in both amplitude and phase, such as square 16-QAM. This can be achieved by splitting the signal into two and supplying one part of the signal to a phase regenerating device such as that of any of the first to fourth embodiments, and the other part of the signal to an amplitude regenerating device such as that of FIG. 15 or 16. The respective outputs from the two arms of such a device are then combined and output.

Figure 17:
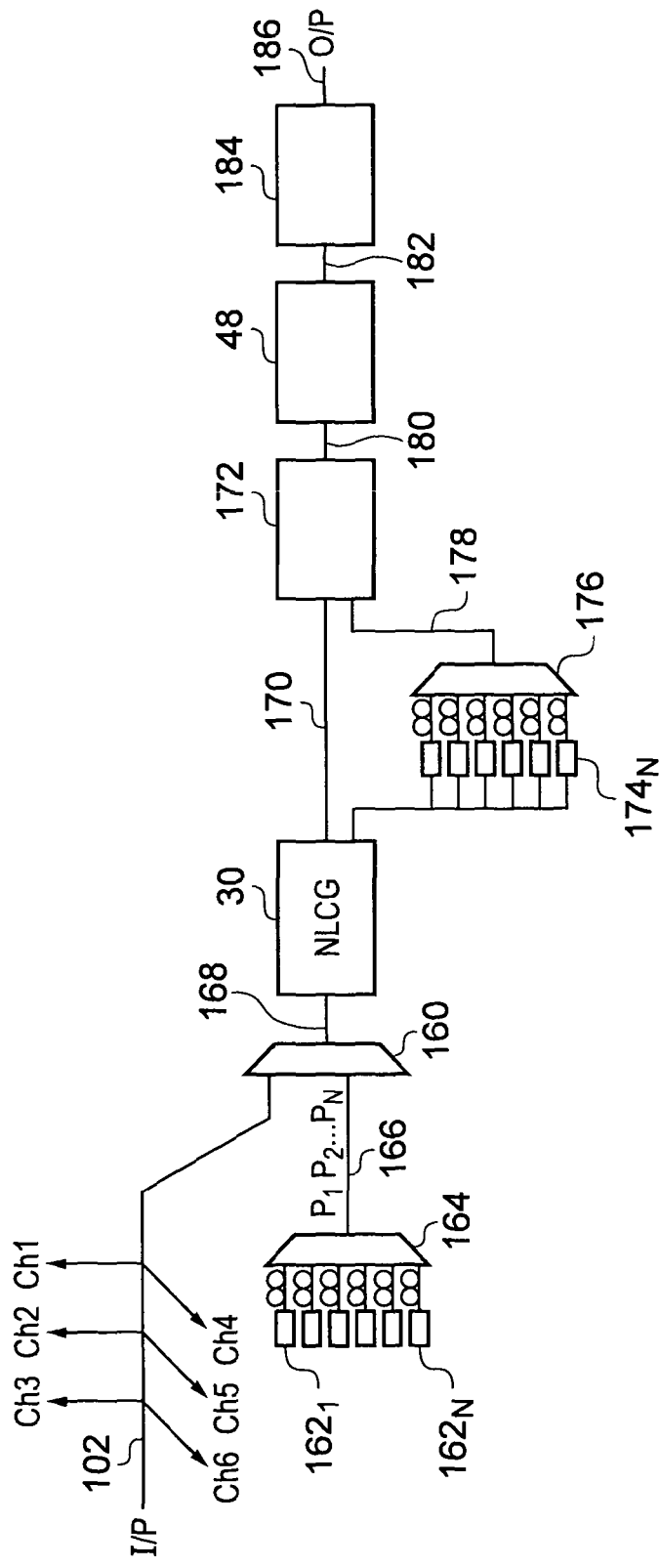
FIG. 17 is a block diagram of another embodiment of a multi channel regenerator.

FIG. 17 is a block diagram of another embodiment of a multi channel regenerator. An input optical path 102 from a communication link conveys an N-channel signal to the module. The figure shows schematically the example of there being N=6 channels derived from 2 polarization states and 3 wavelengths. These numbers are of course arbitrary, and the low number of channels is chosen here principally for clarity of explanation. Each channel is a single multi-level phase modulated signal, such as QPSK. The signal is supplied from the input optical path 102 to one input of a wavelength division multiplexer 160 which combines the N-channel signal with respective N pumps generated by N pump sources $162_N$ which are combined by a further wavelength division multiplexer 164, the output of which is supplied via an optical path 166 to one input of the wavelength division multiplexer 160. The combined N signal and pump pairs are conveyed via an optical path 168 to the input of the non-linear comb generator (NLCG) 30. The nonlinear media used in the NLCG of this embodiment has specially tailored periodic dispersive and/or nonlinear characteristics in the longitudinal dimension, enabling multiple regeneration processes at the different wavelengths and polarizations to be carried out simultaneously without these processes interacting substantially with each other through optical nonlinearity. The output of the multi channel nonlinear comb regenerator is supplied via an optical path 170 to the input of a WDM add/drop multiplexer. Modulation-free phase harmonics from the NLCG 30 are filtered from the output of the NLCG 30 (filter not shown) to drive a bank of N slave sources $174_N$ to generate N further pumps which are combined by a wavelength division multiplexer 176 and supplied to a further input of the add/drop multiplexer 172 via an optical path 178. The add/drop multiplexer 172 applies WDM filtering techniques, such as liquid crystal on silicon, to simultaneously set the phase and amplitude of the multiple signal, harmonics, and pump combinations. The output of the add/drop multiplexer 172 is supplied via an optical path 180 to a second non-linear section 48 that serves as a multi-wavelength/multi-polarization parametric amplification stage in which the optical waves are recombined. The non-linear medium of this second stage has tailored dispersive and/or nonlinear properties that are periodic, or at least substantially periodic, in frequency. The output of the second non-linear stage 48 is then supplied via an optical path 192 to a WDM add/drop multiplexer 184 and then output via an optical path 186.

It will be appreciated that the design of FIG. 17 may be simplified to deal with a WDM input signal with no PDM, or vice versa, with consequent simplification of the internal design of the non-linear components 30, 48.

What is claimed is:

1. An optical device for processing a multi-level phase modulated signal borne on a carrier:
   a first pump source operable to generate a first modulation free pump having an offset from the carrier;
   a first section of non-linear optical material arranged to receive the signal and the first pump, in which the pump and the signal are subject to four-wave mixing to generate a harmonic series of components of the signal separated in wavelength by the offset, the series of components including a first component and a second component;
   a second pump source operable to generate a second pump relatively coherent with the carrier and first pump, and having an offset from the second component; and
   a second section of non-linear optical material arranged to receive the first component and the second component as well as the second pump and optionally also the first pump, in which the first and second components are subject to coherent addition, thereby to regenerate the signal.

2. The optical device of claim 1, wherein the first and second pumps are offset from the first and second components in opposite frequency directions, and the second section of non-linear optical material is arranged to receive both the first and second pumps.

3. The optical device of claim 1, wherein the second pump has a frequency between the first and second components, and the second section of non-linear optical material is arranged to receive the second pump, but not the first pump.

4. The optical device of claim 1, wherein the first and second sections of non-linear optical material are combined into a single contiguous optical path arranged to receive the signal and the first and second pumps.

5. The optical device of claim 1, wherein the first and second sections of non-linear optical material are separate with the second pump being introduced to the second section of non-linear optical material, bypassing the first section of non-linear optical material.

6. The optical device of any preceding claim, wherein the second pump is driven by one of the components that is modulation free.

7. The optical device of any preceding claim, wherein the first and second components are the first order harmonic component and the (N−1)th order harmonic component, where N is the number of pre-coded phase states of the multi-level phase modulated signal.

8. The optical device of claim 1, further comprising a pre-processing stage arranged to receive an optical amplitude modulated signal and convert it to an optical phase modulated signal.

9. The optical device of claim 8, further comprising a post-processing stage arranged to receive the regenerated optical phase modulated signal and reconvert it to an amplitude modulated signal.

10. An optical device module for processing a plurality of wavelength division multiplexed multi-level phase modulated signals, comprising:
    an optical wavelength division demultiplexer for separating the plurality of signals onto respective optical paths;
    a respective plurality of optical devices according to any of claims 1 to 9 arranged in respective ones of the optical paths to regenerate the respective signals; and
    an optical wavelength division multiplexer for recombining the plurality of signals from the respective optical paths into a common output optical path.

11. An optical device module for processing a plurality of polarization and wavelength division multiplexed multi-level phase modulated signals, comprising:
    a polarization splitter configured to separate the plurality of signals into respective subgroups of each polarization state;
    a plurality of optical wavelength division demultiplexers, each wavelength division demultiplexer configured to separate the plurality of signals of a given polarization state onto respective optical paths;
    for each wavelength division demultiplexer a respective plurality of optical devices according to any of claims 1 to 9 arranged in respective ones of the optical paths to regenerate the respective signals;
    for each wavelength division demultiplexer an optical wavelength division multiplexer for recombining the plurality of signals from the respective optical paths into respective common optical paths, one for each polarization state; and a polarization combiner for recombining the signals from each polarization state into a common output optical path.

12. An optical device module for processing a plurality of polarization division multiplexed multi-level phase modulated signals, comprising:
   a polarization splitter for separating the plurality of signals onto respective optical paths;
   a respective plurality of optical devices according to any of claims 1 to 9 arranged in respective ones of the optical paths to regenerate the respective signals; and
   a polarization combiner for recombining the plurality of signals from each polarization state from the respective optical paths into a common output optical path.

* * * * *